May 31, 1949. G. R. FITTERER 2,471,562

METHOD OF UTILIZING METALLURGICAL SLAGS

Filed March 25, 1946

Inventor
GEORGE R. FITTERER

By Francis J. Klempay
Attorney

Patented May 31, 1949

2,471,562

UNITED STATES PATENT OFFICE 2,471,562

METHOD OF UTILIZING METALLURGICAL SLAGS

George R. Fitterer, Oakmont, Pa., assignor to Eric H. Heckett, Valencia, Pa.

Application March 25, 1946, Serial No. 657,027

10 Claims. (Cl. 75—24)

This invention relates to metallurgical processes and more particularly to the treating of fluid open hearth slags and other metallurgical slags for the purposes of economically recovering metallic values contained in the slags, producing slag products specifically adaptable for various uses, or simultaneously reaching both a desirable metal phase product and a desirable slag phase product, while in all cases facilitating the disposition of the slags as they are tapped from the metallurgical furnaces. Such slags are normally considered waste products and are simply discarded although the economic loss resulting from the wastage of the metallic and other values contained therein has long been recognized.

The primary object of the present invention is the provision of new and improved processes for treating fluid metallurgical slags for the production of desirable metallic and/or slag byproducts whereby the treating process generally is more adaptable to specific conditions encountered at the respective places of employment. The inflexibility of methods and processes heretofore proposed for the beneficial treatment of fluid slags of the kind under discussion has seriously limited their applicability and therefore the present invention seeks to provide a widened teaching particularly of those physical and chemical principles which I have found to be most advantageous in the economic processing of metallurgical slags. For example, the present invention provides improved processes whereby a molten basic open hearth slag of common analysis may be converted into either a high manganese-iron alloy or a manganese-silicon alloy with the simultaneous production of agricultural slag, building aggregate, cement clinker, fertilizer, or material suitable for electric furnace flux.

In my co-pending application Ser. No. 657,026 filed concurrently with the present application I have disclosed various processes wherein exothermic reducing materials of desired analysis are added to the slags as they pour into lined thimbles or ladles upon tapping of the furnaces and wherein the reactions are completed in such vessels after which the resultant metallic slag phases are sequentially tapped for separation. I have now found that the general process is much facilitated while additional desirable products can be more economically and expeditiously produced by only partially reducing the metallic oxides in the slag in the initial receiving vessel after which the slag and admixed reducing material is charged in a furnace, preferably of the electric arc type, or onto a coke bed in a cupola for facilitating the completion of the reactions. While the slag may be completely reduced in such furnace or cupola, and it should be understood that the invention contemplates such practice in certain instances, the initial addition of reducing materials particularly if of an exothermic nature is advantageous for the purpose of maintaining the fluidity of the slag, reducing furnace time, etc.

A further and more specific object of the invention is the provision of an improved process for the reduction of iron and manganese oxides from molten basic open hearth slags whereby resultant slags of desired analysis may be produced without the addition of lime or silicon, other than that contained in the reducing materials used, and while utilizing to a maximum extent the latent heat in the slags as they issue from the steel making furnaces.

Another more specific object of the invention is the provision of an improved process for the simultaneous production, from fluid basic open hearth slags, of an alloy containing iron and manganese in usable proportions and of a slag product useful in the manufacture of Portland cement, useful in the manufacture of fertilizer, or useful as a flux in electric furnace steel making operations.

Yet another object of the invention is the provision of an improved method for treating fluid basic open hearth slags involving the passing of fluid slags through an incandescent coke bed or the like for reduction and recovery of the metallic values contained therein while utilizing the latent heat of the slags as received from open hearth furnace and leaving the final slag phase with sufficient fluidity for further processing due to the additional heat imparted in the coke bed.

The above and other objects and advantages of the invention will become apparent upon consideration of the following detailed specification and the accompanying drawing wherein there is disclosed in detail representative applications of the principles of the invention.

Figure 1:
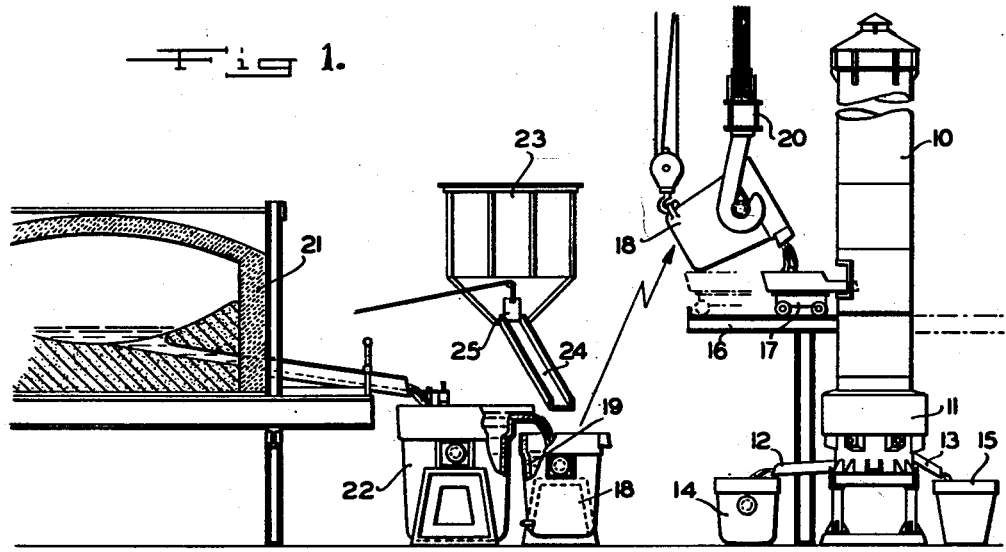
Figure 1 is a schematic showing of a plant and procedure which may be utilized and followed in carrying out the principles of the present invention.

In accordance with the present invention the slag, after being tapped from the steel making furnace, is subjected to reducing actions in a suitable ancillary furnace or cupola wherein the reactions are facilitated and completed in a much shorter period of time by the heat imparted by such ancillary furnace or cupola. This step is utilized irrespective of whether or not reducing reagents are added to the fluid slag before the same is charged in the furnace or cupola and, in fact, in some instances the carbon in the coke bed in the cupola may be utilized as the sole reducing reagent in the carrying out of the process.

I preferably employ a cupola having maintained therein an incandescent coke bed to facilitate the reducing reactions in my processes and to maintain the fluidity of the resultant slag phase for further processing, if desired, and such cupola is indicated in the drawing by reference numeral 10. The cupola 10 may be of conventional construction and, as such, is provided with a wind box 11 below which is contained the metal and slag sump. Depending on the desires of the operators of the mill the cupola or sump may be stopped off and periodically tapped at a higher level to allow the slag to pass down trough 13 into a slag thimble 15. The furnace may be tapped at a lower level to drain off the metal through trough 12 into a ladle 14. It should be understood, however, that through the use of a slag spout, which are well known in the art, the metal and slag may be withdrawn from the cupola in a more or less continuous manner.

I provide a charging platform or track 16 on which is movably mounted a charge transfer car 17 having a projecting trough which may enter into the body of the cupola above the coke bed to pour the molten slag material over the coke bed. During normal operation of the plant the fluid slag being processed, together with materials which may have been added to the slag as it issues from the steel making furnace, is poured into the trough on the car 17 from the slag ladle 18 which initially receives the slag upon tapping of the steel-making furnace. Ladle 18 is preferably lined, as shown at 19, with basic brick such as magnesite since in certain of the methods of the invention it is desirable to intermix the slag with exothermic deoxidizers as the slag is tapped from the steel-making furnace so that the resulting heat developed in the vessel may cause failure of the walls thereof, if unlined. The usual ladle crane 20 may be employed to transfer the slag ladles from the steel-making furnaces to a position above the trough car 17 and to tilt the ladle, thus controllably pouring the contents into the trough car. In a representative plant installation but one cupola 10 will be required for a battery of steel-making furnaces and such cupola will advantageously be located at one end of the pouring pit of the mill.

Reference numeral 21 designates a schematic showing of a conventional basic open hearth furnace and, in accordance with usual practice, the charge therefrom is troughed into the steel ladle 22 with the slag overflow going into the slag ladle 18. Since the invention contemplates that in some instances reducing materials will be intermixed with the slag as it pours into the slag ladle 18, I also provide a material hopper 23 and connected chute 24 which may be supported above the ladle pit by any suitable means, not shown. A control gate 25 determines the amount of material which is added to the slag in the ladle 18.

As initially pointed out, the invention is capable of wide variation in its operation and result, depending on the particular conditions encountered at the respective mills, and the apparatus described above is capable of carrying out any of the more specific methods contemplated by the invention. For example, in recovering the metallic values from molten basic open hearth slag of average analysis while producing a slag of desired analysis, the above described plant may be advantageously utilized in accordance with the following described method to effect the indicated beneficial conversion with a minimum of addition of extraneous materials and heat. Assuming the slag to be treated to have the following analysis—

| | Per cent |
|---|---|
| CaO | 46.55 |
| SiO$_2$ | 16.55 |
| MgO | 5.93 |
| Al$_2$O$_3$ | 2.20 |
| FeO | 9.65 |
| Fe$_2$O$_3$ | 4.01 |
| MnO | 10.25 |
| P$_2$O$_5$ | 3.45 | and that 62.8 lbs. of 50% ferro-silicon per 1,000 lbs. of slag is added to the slag as the same is poured into the ladle 18, it is possible to recover a metal alloy containing 58.6% iron, 34.45% manganese, and 6.58% phosphorus while simultaneously producing a slag of the following analysis—

| | Per cent |
|---|---|
| CaO | 59.7 |
| SiO$_2$ | 29.85 |
| MgO | 7.61 |
| Al$_2$O$_3$ | 2.93 |

Throughout this operation the furnace heat of the molten slag is utilized to the maximum extent and the exothermic heat liberated by the reducing action of the ferro-silicon insures the maintenance of the fluidity of the slag. The admixed materials are then poured from the slag ladle into the cupola by means of the transfer trough 17 and since normally the reaction is continuing while the admixed materials are charged into the cupola the operation is facilitated as will be understood. It will be noted that in this example the amount of ferro-silicon added is insufficient to effect complete reduction of the metallic oxides in the slag so that the carbon in the coke bed in the cupola is utilized as a further reducing agent to complete the deoxidization of the metallic oxides in the slag. The quantity of silicon added in the initial phase of the process is sufficient, however, to bring the lime-silica ratio in the final slag to a 2/1 value which makes this slag suitable for agricultural and road building aggregate as is well understood in the art.

Figure 2:
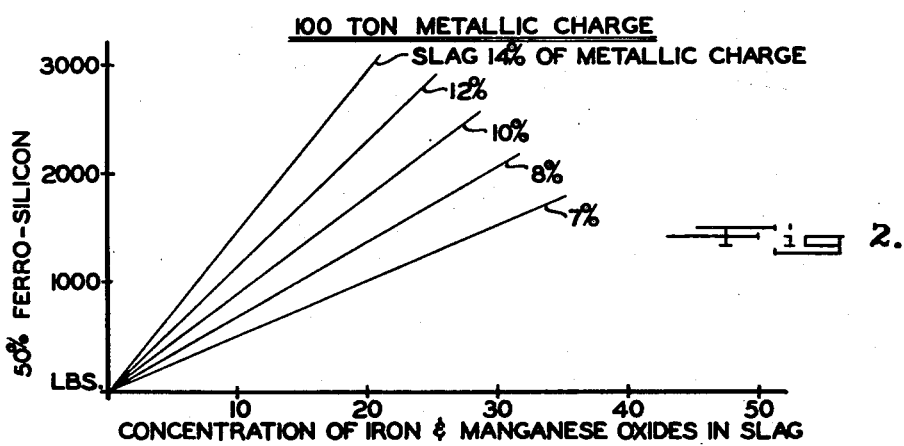
Figure 2 is a chart illustrating the weight requirements of a representative reducing agent under varying slag conditions for complete reduction of the metallic oxides contained in the slags.
Figure 3:
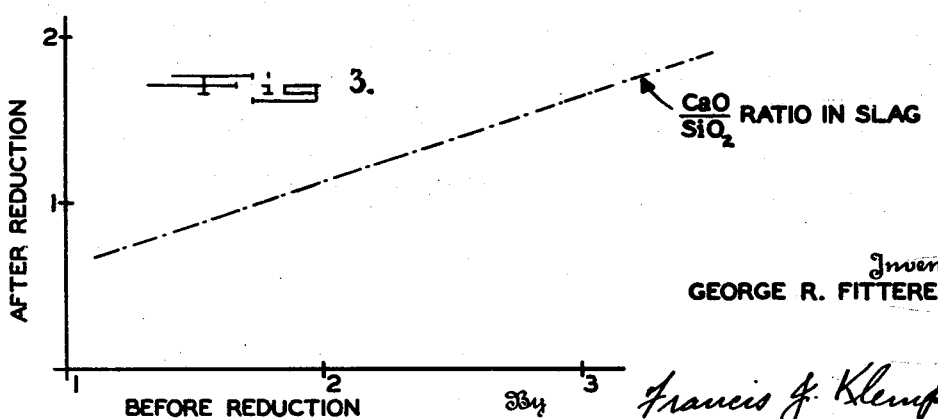
Figure 3 is a curve illustrating the required changes in the calcium-silicon ratios to arrive at resultant slags suitable for use as building aggregate, etc.

It should be observed that in this example the proportion of 50% ferro-silicon added is considerably less than that required for complete deoxidization as indicated in Figure 2. Moreover, it is always possible to effect the desired final lime-silica ratio of 2/1 in the finished slag since the limitations inherent in the ratios (Figure 3) resulting from the completion of reduction through the use of the 50% ferro-silicon charge specified in Figure 2 is not present.

The simultaneous recovery of the metallic values in slag of the above analysis by the sequential deoxidizations with 50% ferro-silicon and carbon in the manner indicated results in an alloy containing approximately 58.6% iron, 34.45% manganese, and 6.58% phophorus. This alloy is useful for various purposes, particularly in the manufacture of high manganese phosphorus steels as used for screw stock, for example, provided that the carbon pick-up in the cupola is not excessive.

The principles of the invention may also be advantageously utilized, in the following described manner, in the recovery of a usable metal alloy from a slag of the above analysis and the simultaneous production of a slag product usable as "clinker" in the manufacture of Portland cement. In this operation it is desirable that the reduction of the metallic oxides in the initial slag be accomplished at least partially by aluminum so as to form a slag with appreciable quantities of $Al_2O_3$ as needed in Portland cement to impart quick "setting" qualities, and strength during the early "setting" period. The usual desired composition of the cement is given by the following formula:

$$CaO = SiO_2 \times 2.8 + Al_2O_3 \times 1.1 - MgO \times 1.4$$

If now the metallic oxides of the initial slag of the common analysis outlined above are completely reduced by aluminum, 93.6 pounds of aluminum will be required for each 1000 pounds of slag and the resulting slag will contain some 22.2% $Al_2O_3$ which is much too high to satisfy the formula above. It would be necessary to add both CaO and $SiO_2$ to properly adjust the composition and, in addition, exothermic thinning agents such as sodium nitrate and fluorspar ($CaF_2$) would probably be required during the addition of the lime.

By partially deoxidizing the metallic oxides in the slag in the transfer ladle 18 with aluminum and completing the deoxidization through contact with the carbon in the cupola it is possible to recover the metal and to arrive at a cement "clinker" slag of desired composition without the addition of materials beyond the initial charge of reducing material in the ladle. Thus, the amount of aluminum added would be reduced to the extent sufficient to increase the $Al_2O_3$ content of the slag to only approximately 7.5% which satisfies the requirements of the above formula. Such reduced amount is, of course, insufficient for complete deoxidization of the metallic oxides but the reaction is quite violent and exothermic and the reduction is readily completed in the cupola or other furnace, if employed.

The above process may also be carried out with the use of Alsifer (20% Al, 40% Si, 40% Fe) but in this case some lime would probably have to be added to the final slag to balance its composition for the purpose involved.

The transfer trough (pouring box or ton-dish) on car 17 is designed to permit the distribution of the slag over the coke bed in the cupola 10 and, of course, the rate of pouring may be controlled by the crane 20. In any of the processes outlined herein high temperature and fluidity of the slag is advantageous for facilitating such distribution and percolation of the fluid mass through the bed as will be understood. Hence, initial partial exothermic reducing reactions are desirable.

However, in certain circumstances it may be entirely practical to effect complete reduction of the iron and manganese oxides contained in the slag in the cupola wherein the reduction is effected by direct contact with carbon and carbon monoxide. The efficacy of this simpler method depends primarily on the temperature and fluidity of the slag as available at the cupola and the nature of the products it is desired to make. Slag of the above initial analysis will produce appreciable qualities of metal alloy containing approximately 40% manganese but because of the carbon contact the alloy will contain up to 4% or 5% carbon. Such material is useful, however, in the manufacture of certain high manganese phosphorus steels. The resulting slag is highly basic and therefore useful for certain agricultural purposes but under certain conditions it may become so viscous that its handling becomes difficult. In this case the addition of sand (silica), either at the time the slag is charged in the cupola or upon tapping of the slag therefrom, may be resorted to to increase its fluidity and the resulting slag product brought to a lime/silica ratio of 2/1 whereby its usefulness for aggregate and road building purposes is established.

The slag resulting from any of the processes outlined above may be utilized in the production of fertilizers by the addition of crushed phosphate rock to increase the $P_2O_5$ content to any desired percentage. However, since the more basic slags are preferred and as these are inherently more viscous the rock should be added immediately upon tapping of the slag from the cupola or furnace at which time the slag is at maximum heat. The addition of exothermic materials such as sodium nitrate and crushed ferro-silicon may be necessary to prevent chilling of the slag during amalgamation of the phosphate rock.

It should now be apparent that I have provided improved processes for treating fluid metallurgical slags which accomplish the objects initially set out. An attempt has been made, through the use of specific examples, to demonstrate the wide applicability of the principles of the invention involving the step of effecting at least partial reduction of the metallic oxides in a furnace or cupola and while the slag is of the same analysis in each of the examples it should be readily understood that variations in the analysis will require changes in the amount or character of the treating materials employed and possibly in the steps of the treatment. As such changes will be apparent to the metallurgist skilled in slag treating technology no attempt is made herein to exhaust the ramifications of the involved process and reliance is therefore placed on the appended claims to delineate the scope of my invention. It should be understood that the above specific examples are not limitative of the invention.

What I claim is:

1. A process for the beneficial treatment of fluid metallurgical slag upon tapping of the same from a steel making furnace which consists of initially intermixing with said slag a quantity of exothermic reducing material operative to effect at least partial deoxidation of the metallic oxides contained in said slag, and completing said deoxidation by reaction wtih carbon in a cupola.

2. A process for the beneficial treatment of fluid metallurgical slag upon tapping of the same from a steel making furnace for the recovery of a metal alloy from the metallic oxides of the slag and the simultaneous production of a slag product usable as Portland cement "clinker" which consists of initially intermixing with said slag a limited quantity of metallic aluminum of an amount insufficient to effect complete reduction of the metal of said oxides, and completing the deoxidation of said metallic oxides by reaction with carbon in a cupola.

3. A process for the beneficial treatment of fluid metallurgical slag upon tapping of the same from a steel making furnace for the recovery of a metal alloy from the metallic oxides of the slag and the simultaneous production of a slag product usable as Portland cement "clinker" which consists of initially intermixing with said slag a limited quantity of metallic aluminum of an amount insufficient to effect complete reduction of the metal of said oxides, and completing the deoxidation of said metallic oxides by reaction with other reducing agents in a heat imparting furnace.

4. A process for the beneficial treatment of fluid metallurgical slag upon tapping of the same from a steel making furnace which consists of initially intermixing with said slag a quantity of exothermic reducing material operative to effect at least partial deoxidation of the metallic oxides contained in said slag, and completing said deoxidation by reaction with other reducing agents in a heat imparting furnace.

5. A process for the beneficial treatment of fluid metallurgical slag upon tapping of the same from a steel making furnace which consists of pouring said slag into a lined vessel while simultaneously adding to said slag a quantity of exothermic reducing material operative to effect at least partial deoxidation of the metallic oxides contained in said slag, and thereafter subjecting the admixed slag and reducing material to further reducing action by percolating the same downwardly through an incandescent coke bed.

6. A process for the beneficial treatment of fluid metallurgical slag upon tapping of the same from a steel making furnace which consists of pouring said slag into a lined vessel while simultaneously adding to said slag a quantity of exothermic reducing material operative to effect at least partial deoxidation of the metallic oxides contained in said slag, and thereafter completing the deoxidation of said oxides in a heat imparting furnace.

7. A process for the beneficial treatment of fluid metallurgical slag upon tapping of the same from a steel making furnace for the recovery of a metallic alloy from the metallic oxides of the slag and the simultaneous production of a useful slag product which consists of initially intermixing with said slag a quantity of ferro-silicon of an amount sufficient only to effect a predetermined lime/silica ratio in the final slag product, and completing the deoxidation of said metallic oxides in a heat imparting furnace.

8. A process for the beneficial treatment of fluid metallurgical slag upon tapping of the same from a steel making furnace for the recovery of a metallic alloy from the metallic oxides of the slag and the simultaneous production of a useful slag product which consists of initially intermixing with said slag a quantity of ferro-silicon of an amount sufficient only to effect a predetermined lime/silica ratio in the final slag product, and thereafter completing the deoxidation of said metallic oxides by reaction of the carbon in a cupola.

9. A process for the beneficial treatment of fluid metallurgical slag upon tapping of the same from a steel making furnace for the recovery of the metal values contained in the metallic oxides of the slag and the simultaneous production of a useful slag product which consists of initially intermixing with said slag a quantity of exothermic reducing material operative to maintain the fluidity of the slag and to effect at least partial deoxidation of said oxides, completing said deoxidation in a heat imparting furnace, separating the metal and slag phases of the product of said furnace, and immediately thereafter infusing the slag phase with the proper quantity of a material required to effect the final desired analysis in the slag product.

10. A process for the beneficial treatment of fluid metallurgical slag upon tapping of the same from a steel making furnace for the recovery of the values contained in the metallic oxides of the slag and the simultaneous production of a slag product useful as an agricultural fertilizer which consists of initially intermixing with said slag a quantity of exothermic reducing material operative to maintain the fluidity of the slag and to effect at least partial deoxidation of said oxides, completing said deoxidation in a heat imparting furnace whereby the heat and fluidity of said slag is further maintained, separating the metal and slag phases of the product of said furnace, and immediately thereafter infusing the slag product with crushed phosphate rock as desired.

GEORGE R. FITTERER.

REFERENCES CITED

The following references are of record in the file of this patent:

UNITED STATES PATENTS

| Number | Name | Date |
|---|---|---|
| 714,331 | Reese | Nov. 25, 1902 |
| 905,280 | Betts | Dec. 1, 1908 |
| 1,591,662 | Eckel | July 6, 1926 |
| 1,754,845 | Baily et al. | Apr. 15, 1930 |
| 1,984,793 | Frankl | Dec. 18, 1934 |
| 2,370,610 | Adeline | Feb. 27, 1945 |

OTHER REFERENCES

S. W. Mudd Series, "Basic Open Hearth Steelmaking," Physical Chemistry of Steel Making Committee, published by A. I. M. E., 1944, N. Y.; page 125. Copy in Division 3.